Jan. 23, 1968    J. R. DISON    3,365,038
SAFETY COUPLING
Filed June 11, 1965

INVENTOR.
James R. Dison
BY
Paul Fitzpatrick
ATTORNEY

United States Patent Office 3,365,038
Patented Jan. 23, 1968

3,365,038
SAFETY COUPLING
James R. Dison, Indianapolis, Ind., assignor to General Motors Corporation, Detroit, Mich., a corporation of Delaware
Filed June 11, 1965, Ser. No. 463,233
12 Claims. (Cl. 192—48)

ABSTRACT OF THE DISCLOSURE

A safety coupling having an intermediate member helically splined to an output shaft for axial movement in response to torque. The sleeve carries splines adapted to engage splines on the input shaft and form a positive clutch between the input shaft and output shaft to transmit positive torque and negative torque up to a predetermined limit. Engagement of the positive clutch is aided by a first spring and positive torque acting through the splines and opposed by flyweights attached to the spring and by negative torque acting through the splines. When the positive clutch is disengaged above the predetermined negative torque, the positive clutch is maintained in ratcheting engagement by a second lighter spring.

My invention relates to a safety coupling, by which I mean a coupling for transmitting unlimited torque in one direction from a driving shaft to a driven shaft and only a predetermined limited amount of negative torque in the other direction, that is, from the driven shaft back through to the driving shaft.

Such devices generally find use in turboprop installations where it is desirable to allow the propeller to windmill and drive the engine up to a predetermined torque loading. This reverse drive can be advantageous, for instance, in order to attempt to restart an engine which has flamed out or to use the propeller-engine combination to produce drag on the aircraft when aircraft drag may be desired such as during landing or diving maneuvers. When the reverse torque exceeds a predetermined limit, however, the safety coupling is designed to disconnect the propeller and driven shaft from the driving or turbine power shaft.

The safety couplings now available generally include a positive connecting means or dog clutch to connect the engine shaft to the propeller shaft to transmit positive torque. This dog clutch also transmits limited negative torque and a spring of some sort usually is used to provide the negative torque limit. When the negative limit has been exceeded and the positive clutch disengaged, the spring has a residual clutch re-engaging force which is necessary for re-engagement of the positive clutch. If this spring has too high a residual force, that is, the force which remains tending to re-engage the positive clutch, the ratcheting load on the disengaged dog clutch is likewise high and may cause excessive wear or be destructive to the positive clutch. Often the residual force desirable for re-engagement is undesirably high with regard to the ratcheting loads produced.

Accordingly, it is the object of my invention to provide a safety coupling having a controlled ratcheting load to minimize the possibility of the destructive effects of ratcheting.

Another object is to provide a safety coupling having a controlled ratcheting load which is especially suited for a substantially constant speed device such as a constant speed turboprop.

Another object is to provide a safety coupling in which the harmful effects of the residual force of the negative torque spring has been eliminated while its desirable characteristics have been retained.

Another object is to provide a safety coupling having a light tickling spring which provides a light controlled ratcheting load on the positive clutch when it is in the disengaged position.

Another object is to provide a safety coupling having a centrifugal means which counteracts the residual force of the main clutch engaging springs to eliminate any ratcheting load caused by the main springs but which also has a second lighter tickling spring which provides a light, controlled and the sole ratcheting load.

Further object and advantages of the present invention will be apparent from the following description, reference being had to the accompanying drawings, wherein a preferred embodiment of the present invention is clearly shown and wherein similar numerals depict similar parts throughout the several views and wherein.

Figure 1:
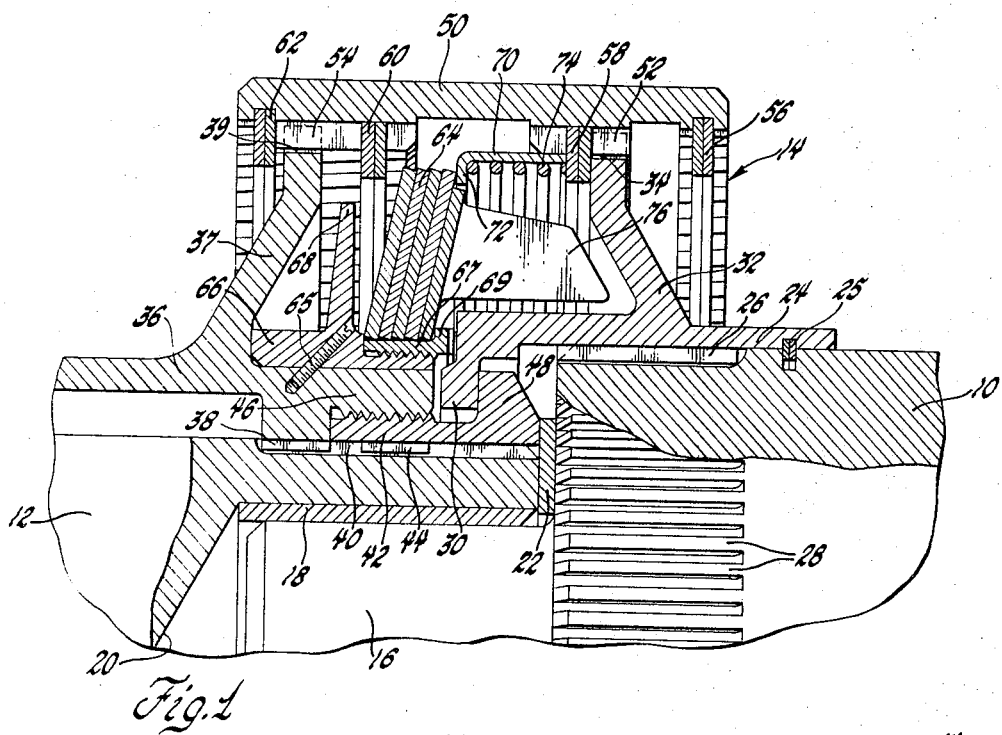
FIGURE 1 is a fragmentary sectional view of a coupling in accordance with the present invention taken on a plane containing the longitudinal axis of the coupling and showing the coupling in the engaged position.

Referring now to FIGURE 1, there is shown a driving shaft 10 connected to a driven shaft 12 through a safety coupling indicated generally at 14. The driving shaft 10 has a forward central extension 16 which is piloted in a plain radial bearing 18 disposed in a cavity 20 in the rear end of the driven shaft 12. A plain thrust bearing 22 is also provided between the driving shaft 10 and the driven shaft 12. A collar 24 has internal straight splines 26 which mate with external straight splines 28 on the driving shaft 10 to connect the collar 24 to the driving shaft 10 for rotational movement. The collar 24 is prevented from slipping off the end of shaft 10 by a hidden snap ring 25. The collar 24 has an inwardly extending annular flange 30 at its forward end for a purpose described below. Extending radially outwardly from the middle of collar 24 is a central flange 32 which has helical splines 34 extending around its entire periphery. A second collar 36 has straight internal splines 38 which mate with straight splines 40 on the driven shaft 12 and a central radially extending flange 37 with helical splines 39 extending around its entire periphery. Locking ring 42 with internal splines 44 is also received in the splines 40 on the driven shaft 12. The locking ring 42 is threaded to the rearward end 46 of the second collar 36 and has an outward flange 48 which overlaps and engages the flange 30 on the first collar 24, thereby fixing the axial displacement of the first collar 24 relative to the second collar 36.

A generally cylindrical intermediate member 50 encircles the collars 24 and 36. The intermediate member 50 is provided with axially spaced internal helical splines 52 and 54 which engage the external helical splines 34 and 39, respectively. The engaged splines 34 and 52 have the same lead but the opposite hand as the engaged splines 39 and 54. As depicted in the drawings, the splines 34 and 52 have a right-hand lead while the splines 39 and 54 have a left-hand lead. The intermediate member 50 carries four sets of inwardly extending snap rings 56, 58, 60, and 62. The snap rings 58 and 60 constitute stops limiting the axial displacement of the intermediate member 50 with respect to the shafts 10 and 12.

Figure 2:
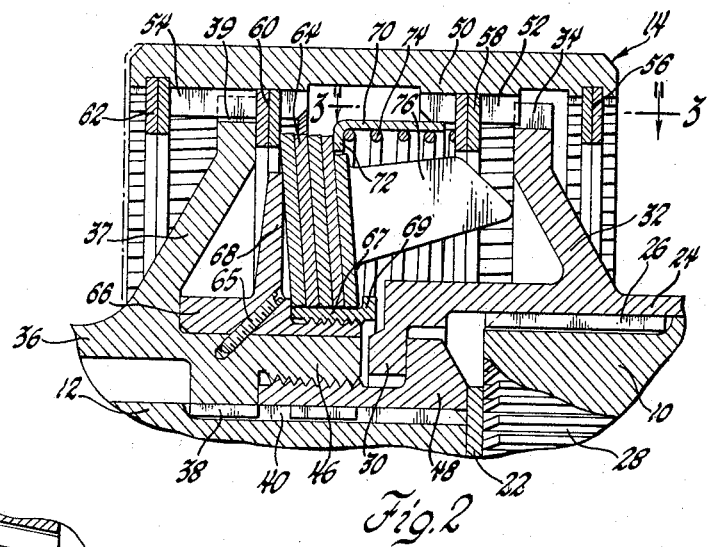
FIGURE 2 is a fragmentary sectional view similar to FIGURE 1 depicting the coupling of the invention in the disengaged, ratcheting position.

A stack of Belleville springs 64 is mounted on a sleeve 67 threaded on a ring 66 which fits on the rearward end of the second collar 36 and is secured thereto by a number of set screws 65. The springs 64 are sandwiched between a radial flange 69 on the sleeve 67 and a radial flange 68 on ring 66. Radial flange 68 also constitutes an abutment for the Belleville springs in the clutch disengaged position as shown in FIGURE 2. The rightmost spring in the Belleville spring stack carries a plurality of flyweights 76. A cylindrical housing 70 floats within the intermediate member 50 and has a flange 72 on its left edge which abuts the rearward end of the Belleville spring stack 64. A coil spring 74 disposed within the housing 70 is biased between the flange 72 and the snap ring set 58.

*Operation*

Figure 3:
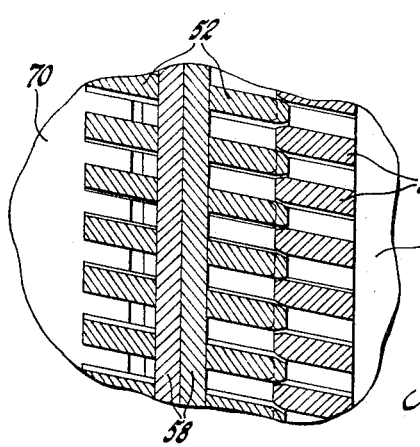
FIGURE 3 is a fragmentary sectional view taken along the line 3—3 in FIGURE 2 and looking in the direction of the arrows.

During normal operation when the driving shaft 10 is driving the driven shaft 12 with positive torque, the intermediate cylindrical member 50 will assume the position shown in FIGURE 1. In this position, power is transmitted from shaft 10 through collar 24, engaged helical splines 34 and 52, member 50, engaged helical splines 39 and 54, and the second collar 36 to the shaft 12. The helix angle of the engaged splines 34 and 52 and engaged splines 39 and 54 is such that positive torque urges the member 50 towards the right into full positive engagement where snap ring set 58 abuts the forward radial face on the central flange 32 which is a part of collar 24. The Belleville spring stack 64 also exerts a spring force through the cylindrical housing 70 and snap ring 58 to urge the intermediate member 50 to the right. The total spring force of the Belleville spring stack 64, however, is not exerted because the centrifugal force of the rotating weights 76 carried on the rightmost Belleville spring creates a counterclockwise turning moment on the spring stack in opposition to the Belleville spring force. The net force of the Belleville spring stack 64 then diminishes with increasing speed. In constant speed installations such as constant speed turboprop applications, the Belleville springs and weights are designed with sufficient residual forces remaining in the Belleville spring stack 64 to establish a desired negative torque limit at design and retain the dog clutch splines 52 and 34 in engagement up to that limit. During torque reversal, that is, when the normally driven shaft 12 attempts to drive the normally driving shaft 10, the intermediate member 50 will be urged toward the left by an axial force created through the action of splines 34, 39, 52, and 54. This leftward movement of the intermediate member 50 will be resisted up to a certain torque level by the residual force remaining in the Belleville spring stack 64 previously mentioned. When this reverse torque limit has been exceeded so that the axial force produced by splines 34, 39, 52, and 54 is greater than the residual Belleville spring force, the intermediate member 50 will start to move to the left toward the disengaged position shown in FIGURE 2. As the member 50 moves to the left, Belleville springs 64 are deflected toward an upright position by housing 70 and snap ring 58. The Belleville spring force thus decreases until it is overcome by the centrifugal force produced by the rotating weights 76. Once overcome, the flyweights 76 hold the Belleville spring stack 64 against the abutment 68. Thus no net force is exerted by the Belleville spring stack 64 on the intermediate member 50 to urge it into ratcheting engagement at the dog splines 52, 34 after the dog clutch has been disengaged. The light coil spring 74, however, now does exert a force on the intermediate member 50 through the snap ring 58 to maintain the ratcheting engagement of the helical splines 52 with the helical splines 34. This second spring force is much lighter than the Belleville spring force and is easily controllable by preselection of the spring rate of the coil spring 74. In addition, the dog splines 34, 52 have their edges ramped to facilitate this ratcheting engagement as can be seen in FIGURE 3. The member 50 will thus reciprocate with a small amplitude due to the ratcheting of the splines 34, 52 with the snap ring 60 abutting the radial face of flange 37 to limit the leftward displacement of member 50.

As the excessive reverse torque is diminished and a positive torque value is approached, the splines 52 and 34 will become engaged moving the member 50 toward the right due to the force of coil spring 74 and the helix angle of the splines 34, 52. As the intermediate member 50 moves toward the right, snap ring 60 engages the leftmost spring in Belleville spring stack 64 decreasing its deflection and increasing its spring force until it overcomes the centrifugal force of the weights 76. The splines 34, 52 are then urged into full engagement by both the Belleville spring force and an axial force created by positive torque acting on the helical splines 34, 39, 52, and 54.

Thus it can be seen that I have invented a safety coupling having a centrifugal responsive means which eliminates the ratcheting load caused by the heavy main clutch engaging springs while a second lighter tickling spring provides a light, controlled ratcheting load whereby I have provided a safety coupling which retains the desirable characteristics of the main negative torque spring while eliminating its harmful effects.

While the above preferred embodiment of my invention has been discussed in connection with use with a turboprop engine installation, it obviously finds use wherever it is desirable to transmit unlimited torque in one direction and a predetermined limited amount of torque in the opposite direction. Various modifications are contemplated and may obviously be resorted to by those skilled in the art without departing from the spirit and scope of the invention, as hereinafter defined by the appended claims, as only a preferred embodiment thereof has been disclosed.

I claim:

1. A safety coupling for connecting an input means to an output means to transmit an unlimited amount of torque in one direction and a limited predetermined amount of torque in the opposite direction comprising:
   input means including a driving shaft and a first set of external helical splines,
   output means including a driven shaft and a second set of external helical splines, said second set of helical splines being of the same lead but opposite hand of said first set,
   an intermediate member having axial spaced sets of internal helical splines encircling said shafts with one set of said splines engaging the external splines of said output means to mount said intermediate member thereon for movement between a first and a second position,
   the first set of external helical splines on said input means and the other set of internal splines constituting a positive clutch coupling said intermediate member and said input means when said intermediate member is in said first position, the helix angle of said splines being such as to move said intermediate member to said first position in response to positive torque, and to said second position in responses to negative torque,
   a housing abutting said intermediate member,
   Belleville spring means disposed between said driven shaft and said housing to bias said intermediate member in said first position,
   centrifugal force means opposing said Belleville spring means and aiding said torque responsive means in the negative torque direction, said Belleville spring means and centrifugal force means establishing said negative torque limit, said centrifugal means overcoming said Belleville spring means when said intermediate member is in said second position, and a coil spring disposed in said housing urging said intermediate member toward said first position causing ratcheting engagment of said positive clutch when said negative torque limit has been exceeded and said intermediate member has been moved to said second position whereby said positive clutch means is maintained in ratcheting engagement by a low, preset, closely controlled force.

2. A safety coupling for connecting an input means to an output means to transmit an unlimited amount of torque in one direction and a limited predetermined amount of torque in the opposite direction comprising:

input means including a driving shaft and a first set of external helical splines, output means including a driven shaft and a second set of external helical splines, an intermediate member having axial spaced sets of internal helical splines encircing said shafts with one set of said splines engaging the external splines on said output means to mount said intermediate member thereon for movement between a first and a second position, the first set of external helical splines on said input means and the other set of internal splines constituting a positive clutch coupling said intermediate member and said input means when said intermediate member is in said first position, the helix angle of said splines being such as to move said intermediate member to said first position in response to positive torque, and to said second position in response to negative torque, a housing abutting said intermediate member, Belleville spring means disposed between said driven shaft and said housing to bias said intermediate member in said first position to establish said negative torque limit, and a coil spring disposed in said housing urging said intermediate member toward said first position causing ratcheting engagement of said positive clutch when said negative torque limit has been exceeded and said intermediate member has been moved to said second position whereby said positive clutch means is maintained in ratcheting engagement by a low, preset, closely controlled force.

3. A safety coupling for connecting an input means to an output means to transmit an unlimited amount of torque in one direction and a limited predetermined amount of torque in the opposite direction comprising:

input means including a driving shaft and a first set of external helical splines, output means including a driven shaft and a second set of external helical splines, an intermediate member having axial spaced sets of internal helical splines encircing said shafts with one set of said splines engaging the external splines on said output means to mount said intermediate member thereon for movement between a first and a second position, the first set of external helical splines on said input means and the other set of internal splines constituting a positive clutch coupling said intermediate member and said input means when said intermediate member is in said first position, the helix angle of said splines being such as to move said intermediate member to said first position in response to positive torque, and to said second position in response to negative torque, Belleville spring means disposed between said driven shaft and said intermediate member to bias said intermediate member in said first position, and centrifugal force means opposing said Belleville spring means and aiding said torque responsive means in the negative torque direction whereby said Belleville spring means and centrifugal force means establishing said negative torque limit.

4. A safety coupling for connecting an input means to an output means to transmit an unlimited amount of torque in one direction and a limited predetermined amount of torque in the opposite direction comprising:

input means including a driving shaft and a first set of external helical splines, output means including a driven shaft and a second set of external helical splines, said second set of helical splines being of the same lead but opposite hand of said first set, an intermediate member having axial spaced sets of internal helical splines encircling said shafts with one set of said splines engaging the external splines on said output means to mount said intermediate member thereon for movement between a first and a second position, the first set of external helical splines on said input means and the other set of internal splines constituting a positive clutch coupling said intermediate member and said input means when said intermediate member is in said first position, the helix angle angle of said splines being such as to move said intermediate member to said first position in response to positive torque and to said second position in response to negative torque, a housing abutting said intermediate member, Belleville spring means disposed between said driven shaft and said housing to bias said intermediate member in said first position through said housing up to a predetermined amount of negative torque, and a coil spring disposed in said housing to urge said intermediate member toward said first position causing ratcheting engagement of said positive clutch when said negative torque limit has been exceeded and said intermediate member has been moved to said second position whereby said positive clutch means is maintained in ratcheting engagement by a low, preset, closely controlled force when said intermediate member is in said second position.

5. A safety coupling for connecting an input means to an output means to transmit an unlimited amount of torque in one direction and a limited predetermined amount of torque in the opposite direction comprising:

input means including a driving shaft and a set of external helical splines, output means including a driven shaft and a set of external helical splines, an intermediate member having axial spaced sets of internal helical splines encircling said shafts with one set of said splines engaging the external splines on one of said means to mount said intermediate member to said one means for movement between a first and a second position, the external helical splines on said other means and the other set of internal splines constituting a positive clutch coupling said intermediate member and said other means when said intermediate member is in said first position, torque responsive means to move said intermediate member to said first position in response to positive torque and to said second position in response to negative torque, a housing abutting said intermediate member, Belleville spring means disposed between said one means and said housing to bias said intermediate member in said first position, centrifugal force means opposing said Belleville spring means and aiding said torque responsive means in the negative torque direction, said Bellevile spring means and centrifugal force means establishing said negative torque limit, said centrifugal means overcoming said Belleville spring means when said intermediate member is in said second position, and a coil spring disposed in said housing urging said intermediate member toward said first position causing ratcheting engagement of said positive clutch when said negative torque limit has been exceeded and said intermediate member has been moved to said second position whereby said positive clutch means is maintained in ratcheting engagement by a low, preset, closely controlled force.

6. A safety coupling for connecting an input means to an output means to transmit an unlimited amount of torque in one direction and a limited predetermined amount of torque in the opposite direction comprising:

input means comprising a driving shaft and a set of external helical splines, output means comprising a driven shaft and a set of external helical splines, an intermediate member having axial spaced sets of internal helical splines encircling said shafts with one set of said splines engaging the external splines on one of said means to mount said intermediate member to said one means for movement between a first and a second position, the external helical splines on said other means and the other set of internal splines constituting a positive clutch coupling said intermediate member and said other means when said intermediate member is in said first position, torque responsive means to move said intermediate member to said first position in response to positive torque and to said second position in response to negative torque, a housing abutting said intermediate member, Belleville spring means disposed between said one means and said housing to bias said intermediate member in said first position to establish said negative torque limit, and a coil spring disposed in said housing urging said intermediate member toward said first position causing ratcheting engagement of said positive clutch when said negative torque limit has been exceeded and said intermediate member has been moved to said second position whereby said positive clutch means is maintained in ratcheting engagement by a low, preset, closely controlled force.

7. A safety coupling for connecting an input means to an output means to transmit an unlimited amount of torque in one direction and a limited predetermined amount of torque in the opposite direction comprising:

input means including a driving shaft and a set of external helical splines, output means including a driven shaft and a set of external helical splines, an intermediate member having axial spaced sets of internal helical splines encircling said shafts with one set of said splines engaging the external splines on one of said means to mount said intermediate member to said one means for movement between a first and a second position, the external helical splines on said other means and the other set of internal splines constituting a positive clutch coupling said intermediate member and said other means when said intermediate member is in said first position, torque responsive means to move said intermediate member to said first position in response to positive torque and to said second position in response to negative torque, Belleville spring means disposed between said one means and said intermediate member to bias said intermediate member in said first position, and centrifugal force means opposing said Belleville spring means and aiding said torque responsive means in the negative torque direction whereby said Belleville spring means and centrifugal force means establish said negative torque limit.

8. A safety coupling for connecting an input means to an output means to transmit an unlimited amount of torque in one direction and a limited predetermined amount of torque in the opposite direction comprising:

input means including a driving shaft and a set of external helical splines, output means including a driven shaft and a set of external helical splines, an intermediate member having axial spaced sets of internal helical splines encircling said shafts with one set of said splines engaging the external splines on one of said means to mount said intermediate member to said one means for movement between a first and a second position, the external helical splines on said other means and the other set of internal splines constituting a positive clutch coupling, said intermediate member and said other shaft when said intermediate member is in said first position, torque responsive means to move said intermediate member to said first position in response to positive torque and to said second position in response to negative torque, a housing abutting said intermediate member, Belleville spring means disposed between said one means and said housing to bias said intermediate member in said first position through said housing up to a predetermined amount of negative torque, and a coil spring disposed in said housing to urge said intermediate member toward said first position causing ratcheting engagement of said positive clutch when said negative torque limit has been exceeded and said intermediate member has been moved to said second position whereby said positive clutch means is maintained in ratcheting engagement by a low, preset, closely controlled force.

9. A safety coupling for connecting an input means to an output means to transmit an unlimited amount of torque in one direction and a limited predetermined amount of torque in the opposite direction comprising:

input means including a driving shaft, output means including a driven shaft, an intermediate member mounted on one of said means for movement between a first and second position, positive clutch means coupling said intermediate member and said other means when said intermediate member is in said first position, torque responsive means to move said intermediate member to said first position in response to positive torque and to said second position in response to negative torque, first spring means urging said intermediate member to said first position, means opposing said first spring means and aiding said torque responsive means to move said intermediate member to said second position, said first spring means and said last mentioned means establishing said negative torque limit, said last mentioned means overcoming said first spring means when said intermediate member is in said second position, and second, lighter spring means urging said intermediate member to said first position whereby said positive clutch means is maintained in ratcheting engagement by a low, preset, closely controlled force when said intermediate member is in said second position.

10. A safety coupling for connecting an input means to an output means to transmit an unlimited amount of torque in one direction and a limited predetermined amount of torque in the opposite direction comprising:

input means including a driving shaft, output means including a driven shaft, an intermediate member mounted on one of said means for movement between a first and second position, positive clutch means coupling said intermediate member and said other means when said intermediate member is in said first position, torque responsive means to move said intermediate member to said first position in response to positive torque and to said second position in response to negative torque, first variable rate spring means urging said intermediate member to said first position, centrifugal force means opposing said first spring means and aiding said torque responsive means to move said intermediate member to said second position, said first spring means and said centrifugal means establishing said negative torque limit, said centrifugal means overcoming said first spring means when said intermediate member is in said second position, and second, lighter constant rate spring means urging said intermediate member to said first position whereby said positive clutch means is maintained in ratcheting engagement by a low, preset, closely controlled force when said intermediate member is in said second position.

11. A safety coupling for connecting an input means to an output means to transmit an unlimited amount of torque in one direction and a limited predetermined amount of torque in the opposite direction comprising:

input means including a driving shaft, output means including a driven shaft, an intermediate member mounted on one of said means for movement between a first and second position, positive clutch means coupling said intermediate member and said other means when said intermediate member is in said first position, torque responsive means to move said intermediate member to said first position in response to positive torque and to said second position in response to negative torque, first spring means urging said intermediate member to said first position, and centrifugal force means opposing said first spring means and aiding said torque responsive means to move said intermediate member to said second position whereby said first spring means and said centrifugal means establish said negative torque limit.

12. A safety coupling for connecting an input means to an output means to transmit an unlimited amount of torque in one direction and a limited predetermined amount of torque in the opposite direction comprising:

input means including a driving shaft, output means including a driven shaft, an intermediate member mounted on one of said means for movement between a first and a second position, positive clutch means coupling said intermediate member and said other means when said intermediate member is in said first position, torque responsive means to move said intermediate member to said first position in response to positive torque and to said second position in response to negative torque, first spring means urging said intermediate member toward said first position, said first spring means establishing said negative torque limit, and second, lighter spring means urging said intermediate member toward said first position causing ratcheting engagement of said positive clutch means when said negative torque limit has been exceeded and said intermediate member has been moved to said second position whereby said positive clutch means is maintained in ratcheting engagement by a low, preset, closely controlled force when said intermediate member is in said second position.

References Cited

UNITED STATES PATENTS

| | | | |
|---|---|---|---|
| 2,432,591 | 12/1947 | Schuckers | 192—104 |
| 2,464,675 | 3/1949 | Dodge | 192—104 |
| 2,561,977 | 7/1951 | Digby | 192—104 |
| 2,908,169 | 10/1959 | Schindel | 192—104 |
| 3,225,876 | 12/1965 | Dison | 192—46 |
| 3,237,404 | 3/1966 | Flanigan et al. | 192—41 |
| 3,249,187 | 5/1966 | McDowall | 192—48 |
| 3,252,553 | 5/1966 | Peterson | 192—48 |

MILTON KAUFMAN, *Primary Examiner.*

FRED C. MATTERN, *Examiner.*

C. J. HUSAR, *Assistant Examiner.*